US011556291B2

United States Patent
Takahashi

(10) Patent No.: US 11,556,291 B2
(45) Date of Patent: Jan. 17, 2023

(54) IMAGE FORMING APPARATUS, NON-TRANSITORY COMPUTER READABLE MEDIUM, AND IMAGE FORMING SYSTEM THAT TRANSMITS INQUIRY WHETHER PRINTING IS ALLOWED FOR PRINT DATA FROM EXTERNAL TERMINAL

(71) Applicant: FUJIFILM Business Innovation Corp., Tokyo (JP)

(72) Inventor: Satoshi Takahashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/466,091

(22) Filed: Sep. 3, 2021

(65) Prior Publication Data

US 2022/0326894 A1 Oct. 13, 2022

(30) Foreign Application Priority Data

Apr. 13, 2021 (JP) .............................. JP2021-067889

(51) Int. Cl.
*G06F 3/12* (2006.01)
(52) U.S. Cl.
CPC .......... *G06F 3/1238* (2013.01); *G06F 3/1222* (2013.01); *G06F 3/1236* (2013.01); *G06F 3/1253* (2013.01); *G06F 3/1292* (2013.01)
(58) Field of Classification Search
None
See application file for complete search history.

(56) References Cited

U.S. PATENT DOCUMENTS

| | | | |
|---|---|---|---|
| 10,013,220 B2 | 7/2018 | Suzuki | |
| 10,225,435 B2 | 3/2019 | Hosoda et al. | |
| 10,609,248 B2 | 3/2020 | Hosoda et al. | |
| 2008/0055659 A1* | 3/2008 | Uchida | H04N 1/32048 358/400 |
| 2020/0186670 A1 | 6/2020 | Hosoda et al. | |
| 2021/0096791 A1* | 4/2021 | Nampo | G06F 3/1292 |

FOREIGN PATENT DOCUMENTS

| | | | |
|---|---|---|---|
| JP | 2016-66217 A | | 4/2016 |
| JP | 2016117286 A | * | 6/2016 |
| JP | 2016-220001 A | | 12/2016 |
| JP | 2017-78986 A | | 4/2017 |

OTHER PUBLICATIONS

English translation of Japanese Patent Application 2015-256083, corresponding to Japanese Patent Application Publication 2016-117286. (Year: 2015).*

* cited by examiner

*Primary Examiner* — Thomas D Lee
(74) *Attorney, Agent, or Firm* — Oliff PLC

(57) ABSTRACT

An image forming apparatus includes a processor configured to: transmit an inquiry as to whether or not printing of print data is allowed to an authenticated terminal when the print data are received from an external terminal, the authenticated terminal having an authority to perform printing and the external terminal being not registered in advance as the authenticated terminal; and make preparation to print the print data when a permission to print the print data is received from the authenticated terminal.

11 Claims, 13 Drawing Sheets

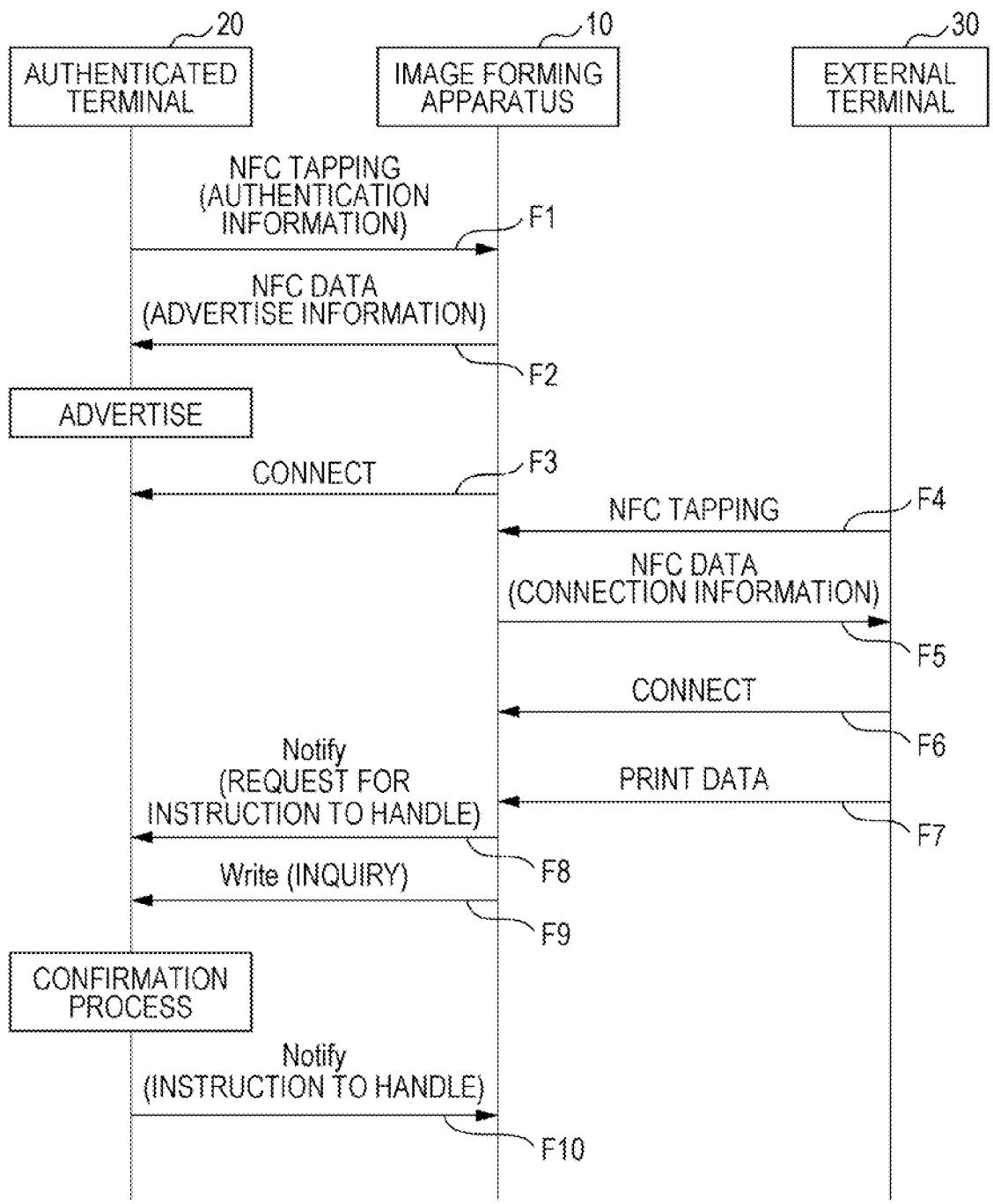

20

20, 30

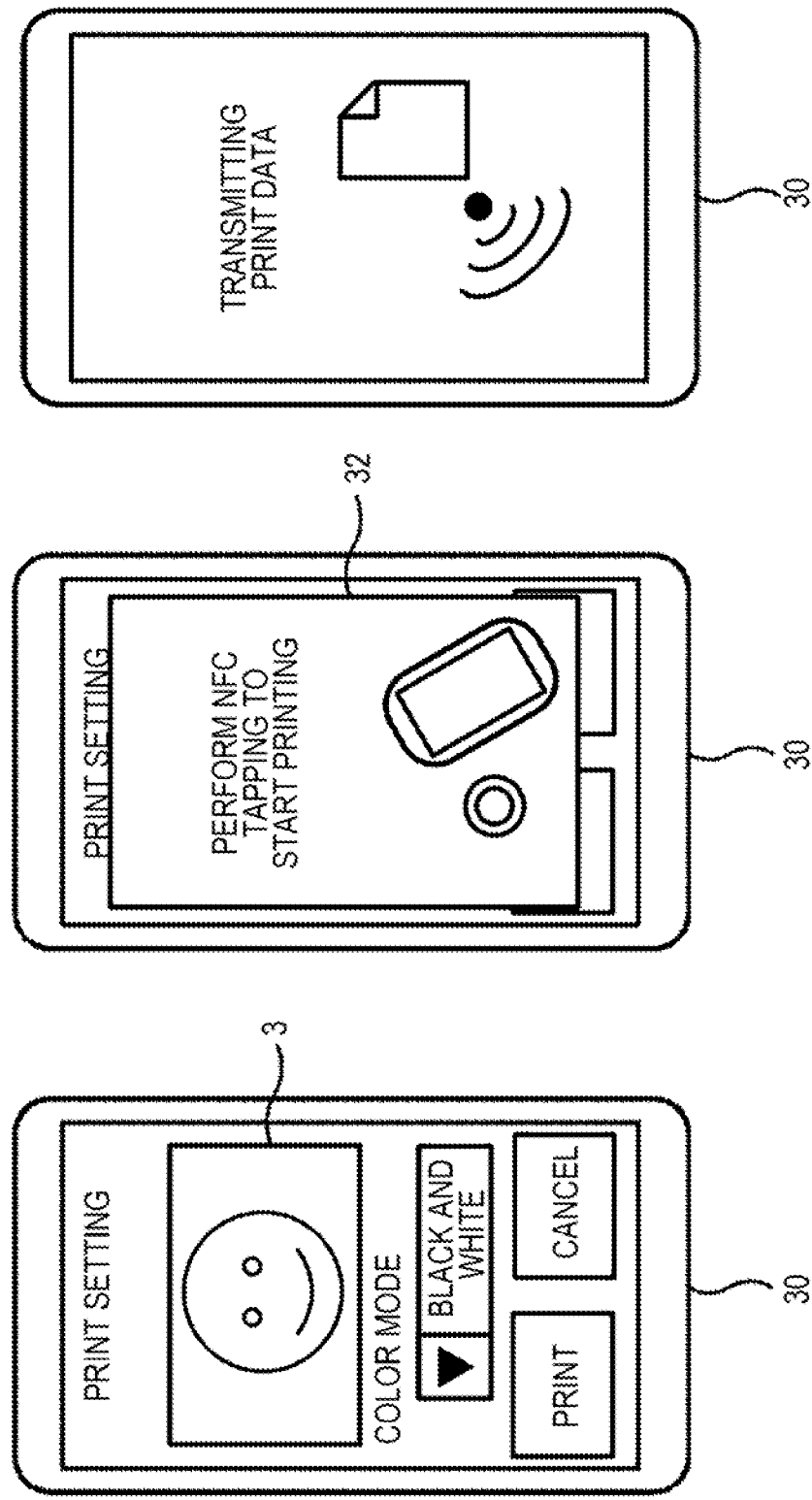

IMAGE FORMING APPARATUS, NON-TRANSITORY COMPUTER READABLE MEDIUM, AND IMAGE FORMING SYSTEM THAT TRANSMITS INQUIRY WHETHER PRINTING IS ALLOWED FOR PRINT DATA FROM EXTERNAL TERMINAL

CROSS-REFERENCE TO RELATED APPLICATIONS

This application is based on and claims priority under 35 USC 119 from Japanese Patent Application No. 2021-067889 filed Apr. 13, 2021.

BACKGROUND

(i) Technical Field

The present disclosure relates to an image forming apparatus, a non-transitory computer readable medium, and an image forming system.

(ii) Related Art

Japanese Unexamined Patent Application Publication No. 2016-66217 discloses a communication system that includes a portable terminal and an information processing apparatus, the portable terminal including an acquisition unit that acquires the distance from the information processing apparatus on the basis of a signal for near-field wireless communication with the information processing apparatus, an establishment unit that establishes near-field wireless communication with the information processing apparatus when the distance acquired by the acquisition unit is less than a first predetermined value, a first transmission unit that transmits a request for a service to the information processing apparatus with the near-field wireless communication established, and a first reception unit that receives a response to the service request from the information processing apparatus, and the information processing apparatus including a second reception unit that receives the service request from the portable terminal, and a second transmission unit that transmits a response to the service request to the portable terminal through the near-field wireless communication.

Japanese Unexamined Patent Application Publication No. 2016-220001 discloses an image forming system that includes an image forming apparatus and a plurality of communication terminals connected to the image forming apparatus, the image forming apparatus including a first storage section that stores a plurality of pieces of user information, a first reception section that receives user information from each of the plurality of communication terminals, an authentication section that authenticates the communication terminals in accordance with whether or not the received user information and the plurality of pieces of user information stored in the first storage section, and a first transmission section that transmits authentication information indicating that the authentication has succeeded to each of the plurality of communication terminals when the authentication has succeeded, the first reception section receiving a stop request that requests a job being executed by the image forming apparatus to be stopped and a new job to be executed by the image forming apparatus from the communication terminal which transmitted the authentication information, the image forming apparatus further including a control section that stops the job being executed and executes the received new job on the basis of the received stop request, each of the communication terminals including a second storage section that stores user information, a second transmission section that transmits the user information to the image forming apparatus, and a second reception section that receives the authentication information from the image forming apparatus, the second transmission section transmitting the stop request and the new job to the image forming apparatus when the authentication information is received.

Japanese Unexamined Patent Application Publication No. 2017-78986 discloses a characteristic job processing system that includes a job processing device, a portable information terminal, and an information processing apparatus, the information processing apparatus including a first transmission unit that transmits a job to the job processing device, the job processing device including a first reception unit that receives the job transmitted by the first transmission unit, a storage unit that stores the job received by the first reception unit, a second transmission unit that transmits information on the job stored in the storage unit to the portable information terminal, and an authentication unit that authenticates a user that logs in to the job processing device, the portable information terminal including a second reception unit that receives the information on the job transmitted by the second transmission unit, a display unit that displays the information on the job received by the second reception unit, a selection unit that selects a job to be executed by the job processing device via information on a plurality of jobs displayed by the display unit, and an instruction unit that provides an instruction to the job processing device in association with identification information on a user, so as to cause the job processing device to execute a job selected by the selection unit when the user is authenticated by the authentication unit, and the job processing device further including an execution unit that executes the job which the job processing device is instructed to execute by the instruction unit and with which the identification information of the user authenticated by the authentication unit is associated, when the user is authenticated by the authentication unit.

SUMMARY

There is an image forming apparatus that performs authentication management in which only print data from an authenticated terminal registered in advance are to be printed.

When an external person that does not have an authenticated terminal such as a guest, for example, attempts to perform printing using an image forming apparatus that performs such authentication management, it is necessary to temporarily register an external terminal of the external person in the image forming apparatus as an authenticated terminal, or send print data to a person that has an authenticated terminal and ask the person to perform printing, which is troublesome compared to when a person that already has an authenticated terminal performs printing.

Aspects of non-limiting embodiments of the present disclosure relate to providing an image forming apparatus, a non-transitory computer readable medium, and an image forming system that allow printing of print data from an unregistered external terminal without newly registering the external terminal as an authenticated terminal even if authentication management in which only print data from an authenticated terminal registered in advance are to be printed.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming apparatus including a processor configured to: transmit an inquiry as to whether or not printing of print data is allowed to an authenticated terminal when the print data are received from an external terminal, the authenticated terminal having an authority to perform printing and the external terminal being not registered in advance as the authenticated terminal; and make preparation to print the print data when a permission to print the print data is received from the authenticated terminal.

BRIEF DESCRIPTION OF THE DRAWINGS

An exemplary embodiment of the present disclosure will be described in detail based on the following figures, wherein:

FIG. 5 is a sequence diagram illustrating an example of the flow of data transmitted and received among the image forming apparatus, the authenticated terminal, and the external terminal when the print process is executed;

FIGS. 7A to 7C illustrate an example of execution of printing by the external terminal;

DETAILED DESCRIPTION

Figure 1:
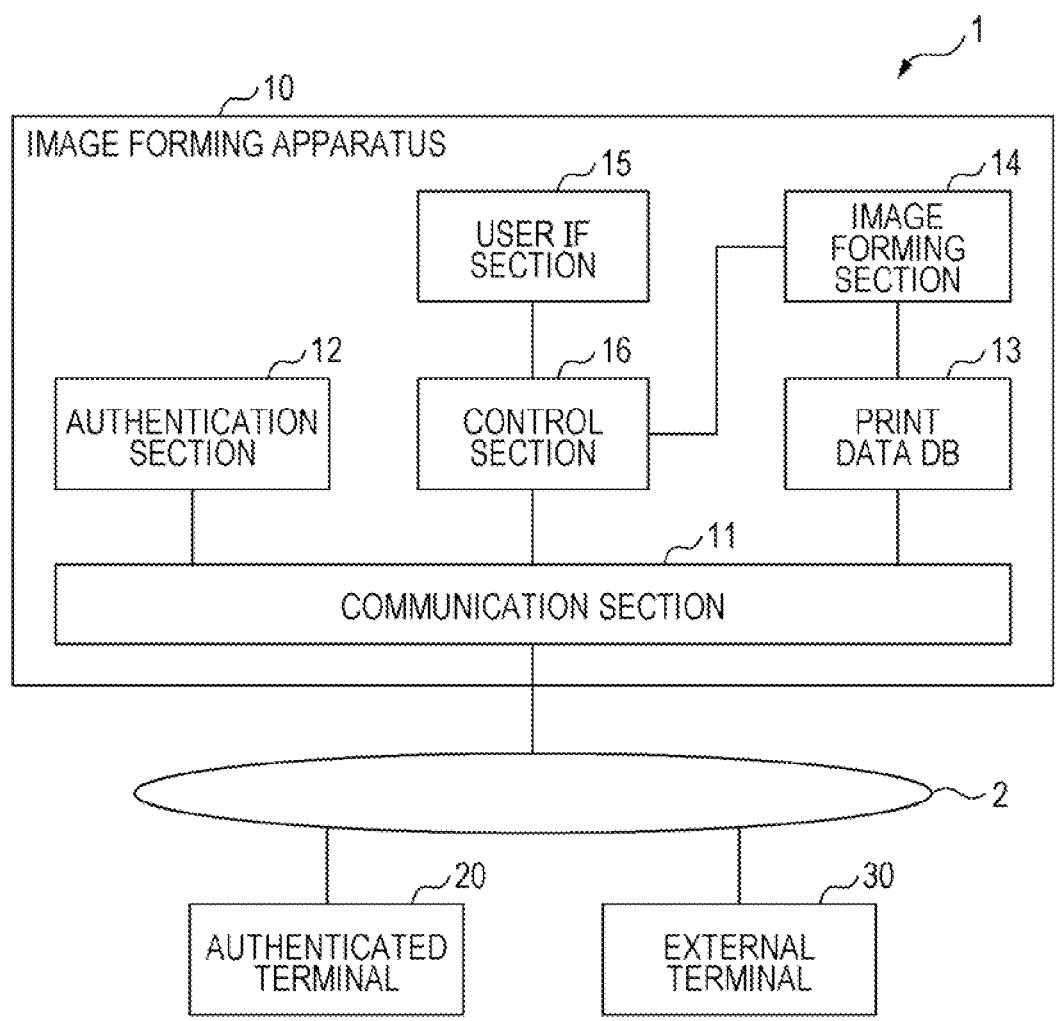
FIG. 1 illustrates an example of the configuration of an image forming system.

The present embodiment will be described below with reference to the drawings. Like constituent elements and like processes are denoted by like reference numerals throughout the drawings to omit redundant description.

FIG. 1 illustrates an example of the configuration of an image forming system 1 that prints a specified image on a recording medium.

As illustrated in FIG. 1, the image forming system 1 includes an image forming apparatus 10, an authenticated terminal 20, and an external terminal 30, and the image forming apparatus 10, the authenticated terminal 20, and the external terminal 30 are connected to each other through a communication line 2.

The image forming apparatus 10 includes an image forming function of printing an image represented in accordance with print data received from the authenticated terminal 20 and the external terminal 30 through the communication line 2 on a recording medium such as paper. The image forming apparatus 10 may be a device that includes a plurality of functions, such as a facsimile, a scanner, and a copier, as long as the device includes the image forming function. Hereinafter, the image forming apparatus 10 is described as a device that includes only the image forming function, by way of example.

The authenticated terminal 20 and the external terminal 30 are each an information device that includes a communication function of transmitting print data stored in a storage device to the image forming apparatus 10 through the communication line 2 together with print setting specified by a user, such as a smartphone, a tablet computer, and a notebook computer, for example. Hereinafter, the authenticated terminal 20 and the external terminal 30 are each described as a smartphone, by way of example.

In the example of the image forming system 1 illustrated in FIG. 1, only one authenticated terminal 20 and only one external terminal 30 are provided. However, the number of authenticated terminals 20 and external terminals 30 included in the image forming system 1 is not limited, and a plurality of authenticated terminals 20 and external terminals 30 may be provided.

Thus, the authenticated terminal 20 and the external terminal 30 are both an information device that transmits print data to the image forming apparatus 10, but are differentiated from each other in accordance with the difference in how to be handled by the image forming apparatus 10 in terms of authentication management.

For information security reasons, the image forming apparatus 10 performs authentication management in which only information devices registered in advance may perform printing using the image forming apparatus 10 and print data received from the other, unregistered information devices may be printed only when the unregistered information devices operate in coordination with an information device registered in the image forming apparatus 10, in order not to receive a print request from a large number of unspecified information devices.

The authenticated terminal 20 is an information device that is registered in the image forming apparatus 10 and that has an authority to perform printing using the image forming apparatus 10. The external terminal 30 is an information device that is not registered in the image forming apparatus 10 and that may perform printing using the image forming apparatus 10 only when operating in coordination with the authenticated terminal 20.

In the case of an image forming apparatus 10 installed in a company, for example, employees of the company occasionally perform printing using the image forming apparatus 10 in daily work, and therefore the information devices of the employees are registered in advance in the image forming apparatus 10. While the information devices of the employees are each an authenticated terminal 20, information devices of guests such as a visitor that pays a temporary visit to the company and an employee of a cooperating company are not registered in the image forming apparatus 10, and thus are each an external terminal 30. That is, the image forming apparatus 10 handles print data received from the authenticated terminal 20 and print data received from the external terminal 30 differently.

The image forming apparatus 10 which performs such authentication management includes functional sections including a communication section 11, an authentication section 12, a print data database (DB) 13, an image forming section 14, a user interface (IF) section 15, and a control section 16.

The communication section 11 receives print data, a print instruction including print setting, and identification information that uniquely identifies an information device that requests printing from the authenticated terminal 20 and the external terminal 30 through the communication line 2, and transmits various information related to printing to be executed by the image forming apparatus 10 to the authenticated terminal 20 and the external terminal 30.

The authentication section 12 collates the identification information received by the communication section 11 with identification information on information devices registered in advance to authenticate whether the information device which requests printing is an authenticated terminal 20 or an external terminal 30. Specifically, the authentication section 12 determines that the information device which requests printing is an authenticated terminal 20 when the identification information registered in advance in the image forming apparatus 10 includes identification information that coincides with the identification information received by the communication section 11.

The identification information to be used for authentication by the authentication section 12 may be any information that uniquely identifies an information device that requests printing, such as a terminal name and a MAC address set in advance for the information device.

The print data DB 13 stores print data received by the communication section 11.

The image forming section 14 prints an image represented by the print data stored in the print data DB 13 on a recording medium. An image forming method of the image forming section 14 is not limited, and a known image forming method such as xerography and an inkjet system may be used, for example.

The user IF section 15 receives an instruction from the user who operates the image forming apparatus 10 and notifies the control section 16 of the instruction, and outputs various information related to printing to be executed by the image forming apparatus 10 to the user in accordance with an instruction from the control section 16.

The control section 16 controls the communication section 11, the authentication section 12, the print data DB 13, the image forming section 14, and the user IF section 15 such that the communication section 11, the authentication section 12, the print data DB 13, the image forming section 14, and the user IF section 15 perform the processes discussed above.

The communication line 2 which connects the image forming apparatus 10, the authenticated terminal 20, and the external terminal 30 is a wireless line, and includes a plurality of wireless communication units. Specifically, the image forming apparatus 10 and the authenticated terminal 20 perform communication using near-field wireless communication, and the image forming apparatus 10 and the external terminal 30 perform communication using a wireless Local Area Network (LAN) and near-field wireless communication.

Near-field wireless communication is wireless communication for communication within the range of a sight distance from several centimeters to several tens of meters. Examples of the near-field wireless communication include BLE (registered trademark) and Near Field Communication (NFC). BLE (registered trademark) is an abbreviation for "Bluetooth (registered trademark) Low Energy".

While BLE (registered trademark) and NFC are examples of near-field wireless communication, the two examples are differentiated for convenience of description. Hereinafter, wireless communication performed using BLE (registered trademark) will be simply referred to as "near-field wireless communication". Meanwhile, wireless communication between an information device and the image forming apparatus 10 performed using NFC is performed with the information device brought close to a distance of several centimeters from an NFC reader attached to the image forming apparatus 10, and thus will be referred to as "NFC tapping".

Figure 2:
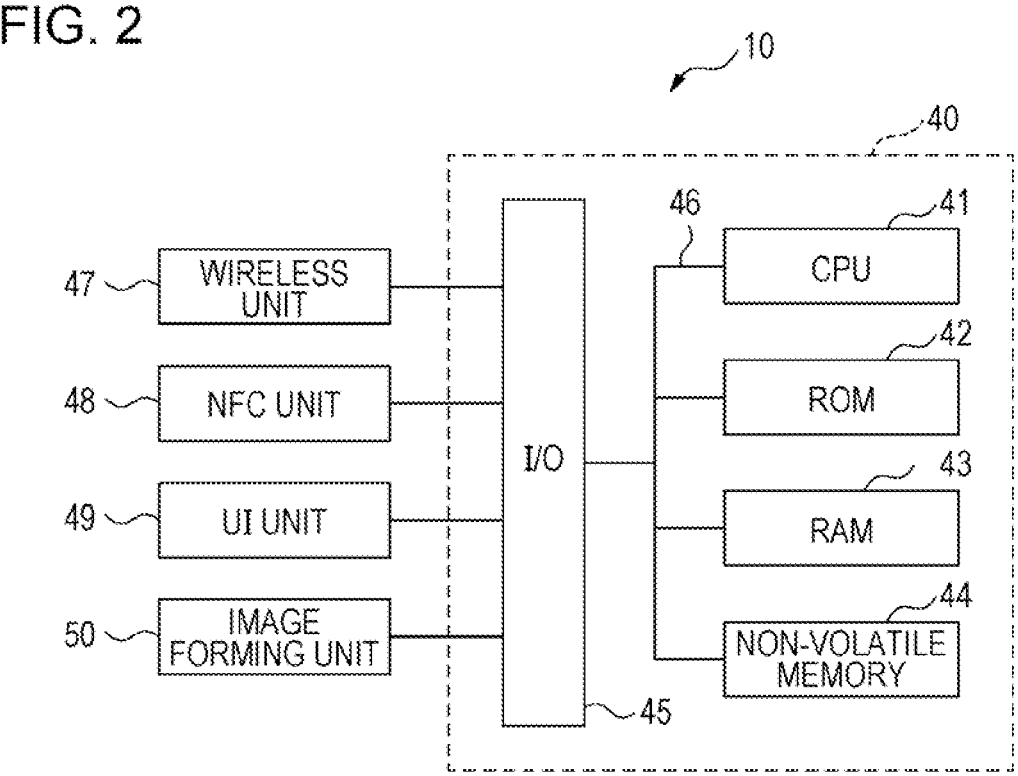
FIG. 2 illustrates an example of the configuration of an image forming apparatus constituted using a computer.

The image forming apparatus 10 illustrated in FIG. 1 is implemented using a computer 40. FIG. 2 illustrates an example of the configuration of the image forming apparatus 10 which is constituted using the computer 40.

The computer 40 includes a central processing unit (CPU) 41 which is an example of a processor that executes the function of the image forming apparatus 10, a read only memory (ROM) 42 that stores an image forming program that causes the computer 40 to function as the image forming apparatus 10, a random access memory (RAM) 43 that is used as a temporary work area for the CPU 41, a non-volatile memory 44, and an input/output interface (I/O) 45. The CPU 41, the ROM 42, the RAM 43, the non-volatile memory 44, and the I/O 45 are connected to each other via a bus 46.

The non-volatile memory 44 is an example of a storage device that keeps stored information even if power supplied to the non-volatile memory 44 is blocked. While a semiconductor memory is used as an example of the non-volatile memory 44, a hard disk may also be used. The non-volatile memory 44 stores identification information on the authenticated terminal 20 registered in advance, for example.

A wireless unit 47, an NFC unit 48, a user interface (UI) unit 49, and an image forming unit 50, for example, are connected to the I/O 45.

The wireless unit 47 supports a communication protocol for performing data communication with the authenticated terminal 20 using near-field wireless communication, and a communication protocol for performing data communication with the external terminal 30 using a wireless LAN.

The NFC unit 48 includes an NFC reader, and reads identification information from the authenticated terminal 20 and the external terminal 30 which have performed NFC tapping and transmits information that is necessary for connection with the authenticated terminal 20 through near-field wireless communication and information that is necessary for connection with the external terminal 30 through a wireless LAN to the authenticated terminal 20 and the external terminal 30, respectively.

The UI unit 49 is a unit that provides an interface between the image forming apparatus 10 and a user that operates the image forming apparatus 10, and is a device that receives an instruction from the user who operates the image forming apparatus 10 and notifies the CPU 41 of the instruction, and that outputs information processed by the CPU 41 to the outside. The UI unit 49 is composed of a button, a touch screen, and a liquid crystal display, for example. The touch screen is attached as superimposed on the liquid crystal display. Information processed by the CPU 41 is displayed on the liquid crystal display. A process associated with an object such as a button displayed at a position on the liquid crystal display and selected via the touch screen is executed.

In the UI unit 49, a display device such as an organic electro-luminescence (EL) display may be used in place of the liquid crystal display.

The image forming unit 50 forms an image on a recording medium in accordance with an instruction from the CPU 41.

Figure 3:
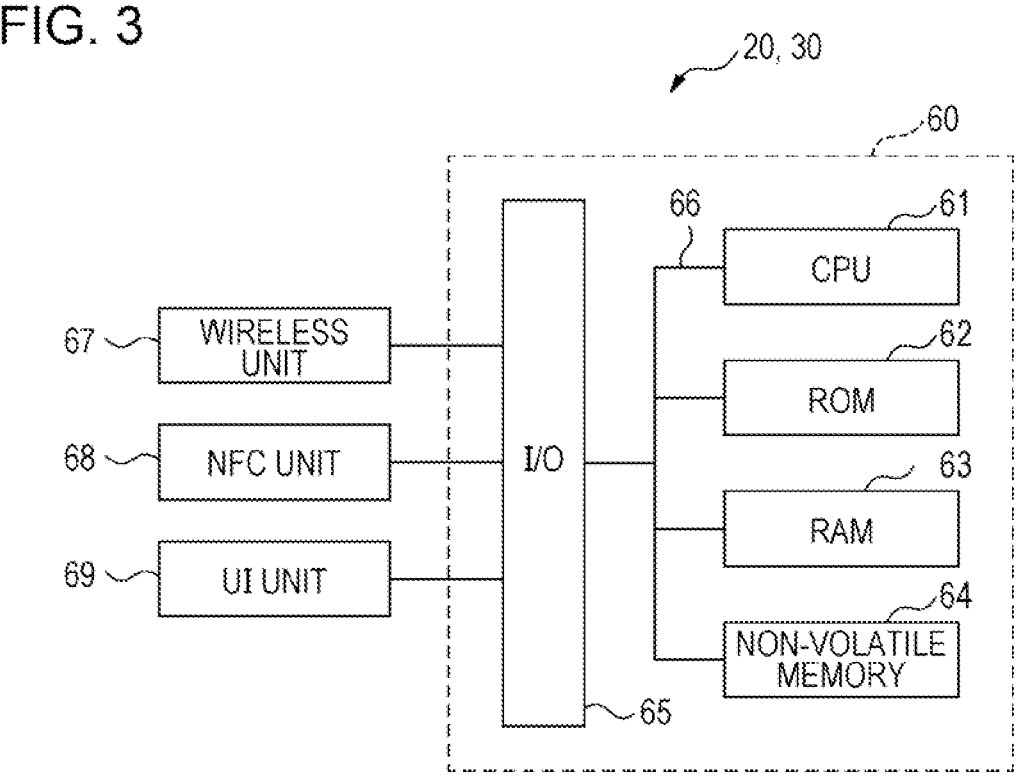
FIG. 3 illustrates an example of the configuration of an authenticated terminal and an external terminal constituted using a computer.

Meanwhile, information devices such as the authenticated terminal 20 and the external terminal 30 illustrated in FIG. 1 are also each implemented using a computer 60. FIG. 3 illustrates an example of the configuration of the authenticated terminal 20 and the external terminal 30 which are each constituted using the computer 60. In the description of FIG. 3, it is not necessary to differentiate the authenticated terminal 20 and the external terminal 30 from each other, and therefore the authenticated terminal 20 and the external terminal 30 are simply referred to as an "information device".

The computer 60 includes a CPU 61 which is an example of a processor that executes the function of the information device, a ROM 62 that stores a program that causes the computer 60 to function as the information device, a RAM 63 that is used as a temporary work area for the CPU 61, a non-volatile memory 64, and an I/O 65. The CPU 61, the ROM 62, the RAM 63, the non-volatile memory 64, and the I/O 65 are connected to each other via a bus 66.

The non-volatile memory 64 stores print data to be printed by the image forming apparatus 10, for example.

A wireless unit 67, an NFC unit 68, and a UI unit 69, for example, are connected to the I/O 65.

The wireless unit 67 supports a communication protocol for performing data communication with the image forming apparatus 10 using a wireless LAN and near-field wireless communication. The wireless unit 67 of the authenticated terminal 20 uses near-field wireless communication for data communication with the image forming apparatus 10. The wireless unit 67 of the external terminal 30 uses a wireless LAN for data communication with the image forming apparatus 10.

The NFC unit 68 transmits identification information on the information device to the image forming apparatus 10 on which NFC tapping has been performed, and receives information that is necessary to connect to the image forming apparatus 10 using the wireless unit 67 from the image forming apparatus 10.

The UI unit 69 is a unit that provides an interface between the information device and a user that operates the information device, and receives an instruction from the user who operates the information device and notifies the CPU 61 of the instruction, and outputs information processed by the CPU 61 to the outside. As with the UI unit 49 of the image forming apparatus 10, the UI unit 69 is composed of a button, a touch screen, and a liquid crystal display, for example. The touch screen is attached as superimposed on the liquid crystal display. As a matter of course, a display device such as an organic EL display is occasionally used in place of the liquid crystal display.

Hereinafter, a user that operates the authenticated terminal 20, among the information devices, will be referred to as an "employee", and a user that operates the external terminal 30 will be referred to as a "guest", for convenience of description.

Next, a print process performed by the image forming apparatus 10 will be described in detail.

Figure 4:
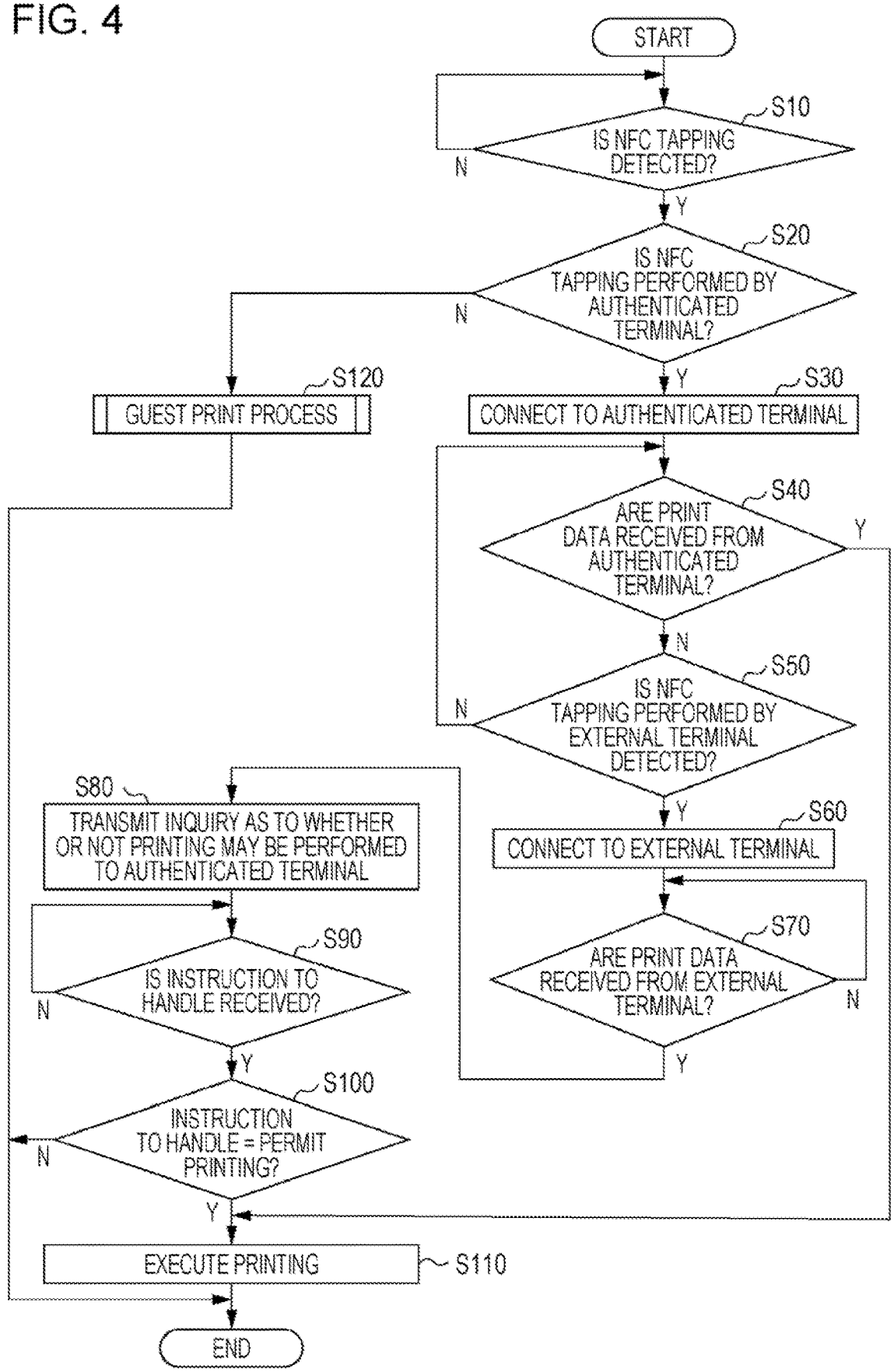
FIG. 4 is a flowchart illustrating an example of a print process executed by the image forming apparatus.

FIG. 4 is a flowchart illustrating an example of a print process to be executed by the CPU 41 of the image forming apparatus 10 after the image forming apparatus 10 is turned on, for example. FIG. 5 is a sequence diagram illustrating the flow of data transmitted and received among the image forming apparatus 10, the authenticated terminal 20, and the external terminal 30 when the print process illustrated in FIG. 4 is executed.

The image forming program which prescribes the print process is stored in advance in the ROM 42 of the image forming apparatus 10, for example. The CPU 41 of the image forming apparatus 10 reads the image forming program stored in the ROM 42, and executes the print process.

When the authenticated terminal 20 performs printing using the image forming apparatus 10, and when the authenticated terminal 20 permits printing by the external terminal 30, it is necessary to connect to the image forming apparatus 10 through the communication line 2. Therefore, guidance on the procedure for connection with the image forming apparatus 10 is first provided when the authenticated terminal 20 starts a connection service.

Figure 6A:
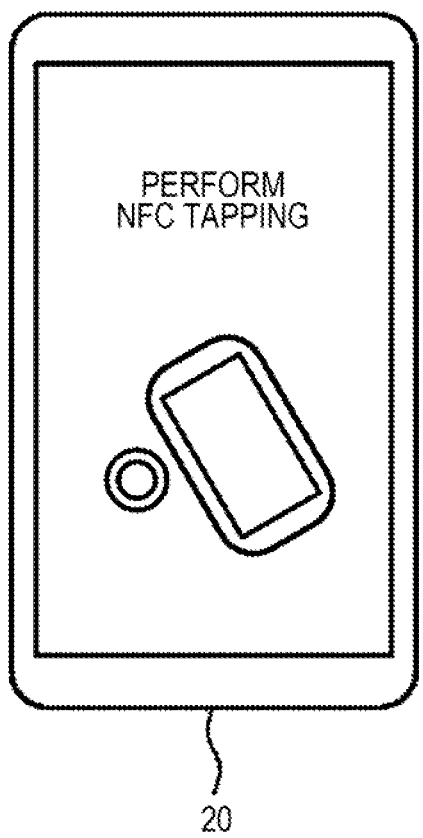
FIGS. 6A and 6B illustrate an example of guidance on the procedure for connection with the image forming apparatus to be displayed on the authenticated terminal and an example of display to indicate the completion of connection with the image forming apparatus to be displayed on the authenticated terminal and the external terminal, respectively.

FIG. 6 illustrates an example of guidance on the procedure for connection with the image forming apparatus 10 to be displayed on the authenticated terminal 20. When the authenticated terminal 20 attempts to connect to the image forming apparatus 10, guidance that prompts NFC tapping on the image forming apparatus 10, such as that illustrated in FIG. 6A, is displayed on the authenticated terminal 20. In addition, as described later with reference to FIGS. 8A to 8C, guidance that prompts NFC tapping on the image forming apparatus 10 is also displayed when the external terminal 30 attempts to perform printing. Accordingly, NFC tapping is performed using the authenticated terminal 20 or the external terminal 30.

When NFC tapping is performed using the authenticated terminal 20 or the external terminal 30, the CPU 41 detects through the NFC unit 48 which information device of the authenticated terminal 20 and the external terminal 30 has performed NFC tapping on the image forming apparatus 10 in step S10 in FIG. 4. If NFC tapping performed using the authenticated terminal 20 or the external terminal 30 is not detected, the CPU 41 continuously detects NFC tapping by repeatedly executing the determination process in step S10. If NFC tapping performed using the authenticated terminal 20 or the external terminal 30 is detected, the process proceeds to step S20. A sequence F1 in FIG. 5 indicates a situation in which NFC tapping has been performed using the authenticated terminal 20.

In step S20 in FIG. 4, the CPU 41 determines whether or not the information device which is used to perform NFC tapping on the image forming apparatus 10 is the authenticated terminal 20. If NFC tapping is performed using an information device, identification information is transmitted from the information device which is used to perform NFC tapping to the image forming apparatus 10. Thus, the CPU 41 may determine that the information device which is used to perform NFC tapping is the authenticated terminal 20 if the identification information received through the NFC unit 48 coincides with any of identification information on the authenticated terminal 20 stored in advance in the non-volatile memory 44.

If the information device which is used to perform NFC tapping is the authenticated terminal 20, the process proceeds to step S30. In the following description, the authenticated terminal 20 which is used to perform NFC tapping will be simply referred to as an "authenticated terminal 20".

In step S30, the CPU 41 connects to the authenticated terminal 20 by controlling the wireless unit 47, to be able to perform data communication with the authenticated terminal 20 using near-field wireless communication.

To that end, the CPU 41 first transmits advertise information (sequence F2 in FIG. 5) to the authenticated terminal 20 through the NFC unit 48.

The authenticated terminal 20 which has received the advertise information from the image forming apparatus 10 performs advertising using near-field wireless communication. The advertising is a process in which the authenticated terminal 20 broadcasts information (called "connection information") that is necessary for connection to the authenticated terminal 20 to a different device (in this case, the image forming apparatus 10) located within the range of reach of radio waves for near-field wireless communication repeatedly at intervals determined in advance, and waits for the image forming apparatus 10 to connect to the authenticated terminal 20 by way of near-field wireless communication.

Figure 6B:
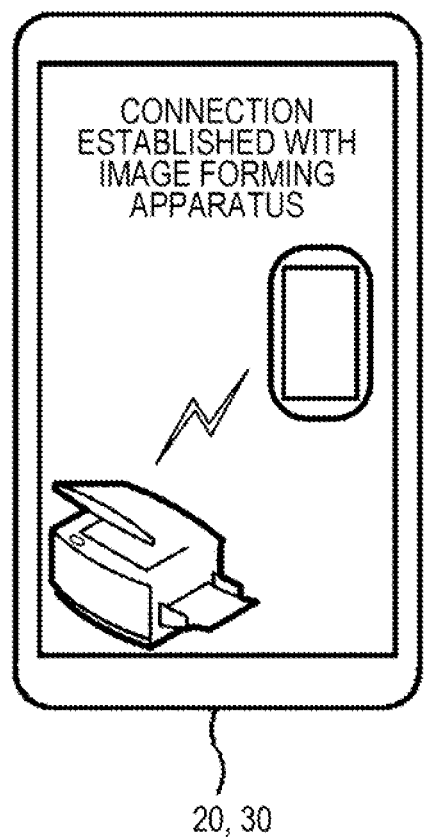

The CPU 41 of the image forming apparatus 10 which has the received connection information from the authenticated terminal 20 connects to the authenticated terminal 20 using the received connection information (sequence F3 in FIG. 5). Consequently, the communication line 2 is established between the image forming apparatus 10 and the authenticated terminal 20 using near-field wireless communication. When connection with the image forming apparatus 10 is completely established, an indication of the completion of connection such as that illustrated in FIG. 6B is displayed on the authenticated terminal 20.

After the communication line 2 is established with the authenticated terminal 20 using near-field wireless communication, the CPU 41 determines whether or not print data have been received from the authenticated terminal 20 by way of near-field wireless communication in step S40 in FIG. 4. If print data have not been received, the process proceeds to step S50.

Meanwhile, NFC tapping on the image forming apparatus 10 triggers printing also when the external terminal 30 executes printing using the image forming apparatus 10 (sequence F4 in FIG. 5). Thus, in step S50, the CPU 41 determines whether or not NFC tapping performed using the external terminal 30 is detected.

If NFC tapping performed using the external terminal 30 is not detected, the process proceeds to step S40. That is, the CPU 41 monitors variations in the situation by repeatedly executing steps S40 and S50 until print data are received from the authenticated terminal 20 or NFC tapping performed using the external terminal 30 is detected.

If NFC tapping performed using the external terminal 30 is detected in the determination process in step S50, the process proceeds to step S60.

In the case of the external terminal 30, unlike the authenticated terminal 20, it is unknown what model is used as the external terminal 30. Thus, in step S60, the CPU 41 connects to the external terminal 30 through a wireless LAN, which is provided in advance to information devices of any model, by controlling the wireless unit 47, to be able to perform data communication with the external terminal 30 using a wireless LAN.

To that end, the CPU 41 transmits connection information (e.g. an IP address etc.) that is necessary to connect to the image forming apparatus 10 through a wireless LAN to the external terminal 30 through the NFC unit 48 (sequence F5 in FIG. 5). The external terminal 30 which has received the connection information from the image forming apparatus 10 connects to the image forming apparatus 10 by way of a wireless LAN using the received connection information (sequence F6 in FIG. 5). Consequently, the communication line 2 is established between the image forming apparatus 10 and the external terminal 30 using a wireless LAN. When connection with the image forming apparatus 10 is completely established, an indication of the completion of connection such as that illustrated in FIG. 6B is displayed on the external terminal 30.

The fact that the external terminal 30 has performed NFC tapping on the image forming apparatus 10 indicates that a guest desires to execute printing from the external terminal 30.

FIGS. 7A, 7B, and 7C illustrate an example of execution of printing by the external terminal. When a guest performs printing from the external terminal 30, a print driver installed in the external terminal 30 displays a setting screen on which print setting is made for print data to be printed. The print setting refers to information to be used to determine whether or not print data may be printed, and information for indicating what form the print data are to be printed in to the image forming apparatus 10 when the print data are to be printed.

For example, the print setting includes setting for the color mode specifying whether an image represented by the print data is to be printed in color or black and white, the printing surface specifying whether an image represented by the print data is to be printed on one or both of the two surfaces of a recording medium, the number of copies to be printed, the size of a recording medium to be used, etc.

FIG. 7A illustrates an example of a setting screen for making print setting for the print data. The print setting screen illustrated in FIG. 7A displays a thumbnail 3 of the first page of images represented by the print data together with print setting items. When a guest selects a print button after setting the content of various print settings displayed on the setting screen, a dialogue 32 that provides guidance on NFC tapping is displayed on the external terminal 30 as illustrated in FIG. 7B.

When the guest performs NFC tapping by moving the external terminal 30 closer to the NFC unit 48 of the image forming apparatus 10 in accordance with the guidance on NFC tapping displayed in the dialogue 32, NFC tapping performed using the external terminal 30 is detected by the determination process in step S50 in FIG. 4, and the image forming apparatus 10 and the external terminal 30 are connected to each other through a wireless LAN.

When the image forming apparatus 10 and the external terminal 30 are connected to each other through a wireless LAN, the external terminal 30 transmits print data to be printed, together with print setting, to the image forming apparatus 10 by way of a wireless LAN (sequence F7 in FIG. 5). FIG. 7C illustrates an example of a screen displayed on the external terminal 30 which is transmitting print data.

Thus, in step S70, the CPU 41 determines whether or not print data have been received from the external terminal 30 by way of a wireless LAN.

If print data have not been received, the CPU 41 repeatedly executes the determination process in step S70, and stands by until print data are received from the external terminal 30. If print data have been received from the external terminal 30, on the other hand, the process proceeds to step S80.

As discussed already, the external terminal 30 itself does not have an authority to perform printing. Therefore, the CPU 41 does not start preparation for printing just when the CPU 41 has received print data from the external terminal 30, but temporarily stores the received print data in the RAM 43. Moreover, in step S80, the CPU 41 transmits an inquiry as to whether or not the print data received from the external terminal 30 may be printed to the authenticated terminal 20 which has performed NFC tapping by way of near-field wireless communication.

To transmit an inquiry to the authenticated terminal 20 using near-field wireless communication, the CPU 41 first instructs the authenticated terminal 20 to transmit an instruction to handle an inquiry to the image forming apparatus 10 using a Notify command (sequence F8 in FIG. 5). After that, the CPU 41 transmits an inquiry to the authenticated terminal 20 using a Write command (sequence F9 in FIG. 5).

When the inquiry is received from the image forming apparatus 10 in this manner, the authenticated terminal 20 executes a confirmation process as to whether or not the print data received from the external terminal 30 may be printed.

Figure 8C:
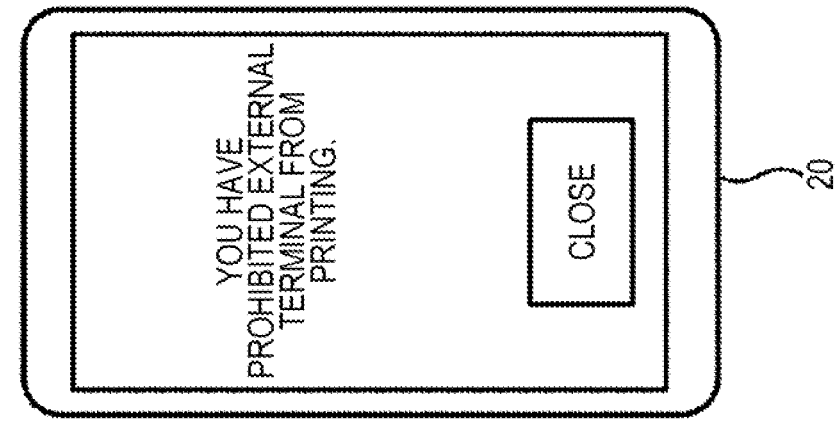
FIGS. 8A to 8C each illustrate an example of a screen during execution of a confirmation process to be displayed on the authenticated terminal.
Figure 8B:
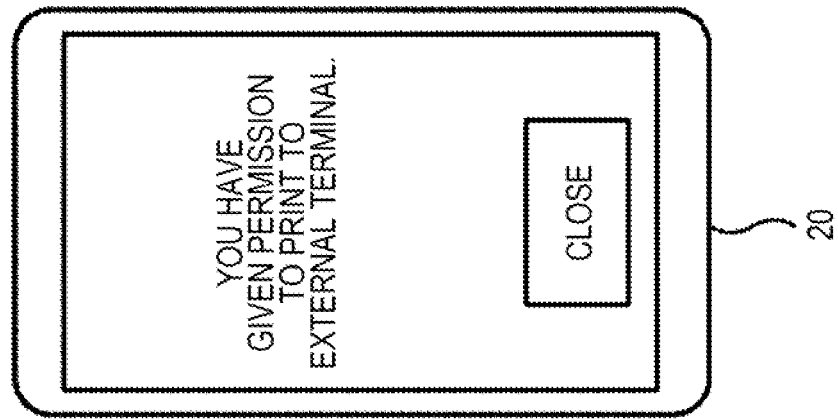
Figure 8A:
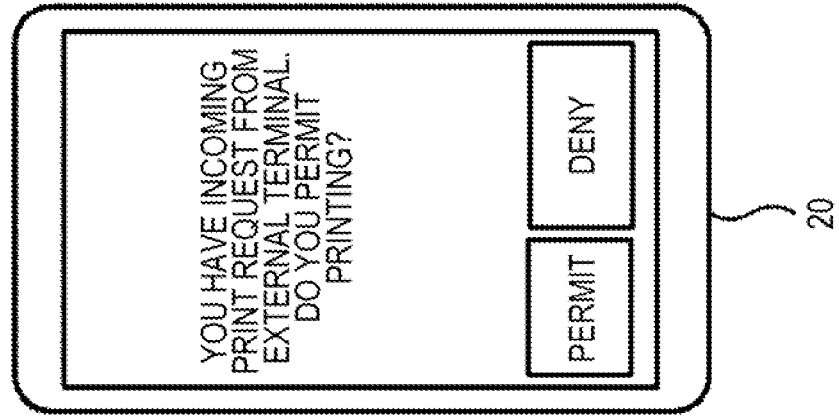

FIGS. 8A to 8C each illustrate an example of a screen to be displayed on the authenticated terminal 20 for the confirmation process. When the inquiry is received from the image forming apparatus 10, a confirmation screen such as that illustrated in FIG. 8A is displayed on the authenticated terminal 20. The confirmation screen includes a permit button that is used to provide an instruction to permit printing of the print data received from the external terminal 30, and a deny button that is used to provide an instruction not to permit printing.

An employee selects the permit button to permit printing of the print data that a guest attempts to print from the external terminal 30. FIG. 8B illustrates an example of a screen to be displayed on the authenticated terminal 20 when an employee selects the permit button on the confirmation screen, indicating that a print permission is provided for the print data that a guest attempts to print from the external terminal 30.

On the other hand, an employee selects the deny button to deny printing of the print data that a guest attempts to print from the external terminal 30. FIG. 8C illustrates an example of a screen to be displayed on the authenticated terminal 20 when an employee selects the deny button on the confirmation screen, indicating that a print permission is not provided for the print data that a guest attempts to print from the external terminal 30.

When an employee selects the permit button or the deny button on the confirmation screen, the authenticated terminal 20 transmits an instruction to handle the inquiry to the image forming apparatus 10 using a Notify command (sequence F10 in FIG. 5).

Thus, in step S90 in FIG. 4, the CPU 41 determines whether or not an instruction to handle the print data received from the external terminal 30 has been received from the authenticated terminal 20. If an instruction to handle has not been received from the authenticated terminal 20, the CPU 41 monitors reception of an instruction to handle by repeatedly executing the determination process in step S90. If an instruction to handle has been received from the authenticated terminal 20, on the other hand, the process proceeds to step S100.

If the permit button is selected on the confirmation screen of the authenticated terminal 20, the content of the instruction to handle is set to permit printing. If the deny button is selected on the confirmation screen of the authenticated terminal 20, the content of the instruction to handle is set to prohibit printing. That is, the instruction to handle is an example of an instruction indicating whether or not to permit printing of print data.

Thus, in step S100, the CPU 41 determines whether or not the content of the instruction to handle is set to permit printing. If the content of the instruction to handle is set to permit printing, the process proceeds to step S110. In step S110, the CPU 41 makes preparation for printing of the print data received from the external terminal 30. The preparation for printing includes bringing the image forming apparatus 10 into a state in which the image forming apparatus 10 is ready to print, and includes correcting the density of an image and warming-up of the image forming unit 50 such as heating a fixing device that fixes an image to a recording medium using heat, for example.

The CPU 41 may start printing of the print data after preparation for printing has been completed. However, the CPU 41 may start printing of the print data after notifying an information device that transmitted the print data that preparation for printing has been completed and receiving an instruction to start printing from the information device which transmitted the print data. Thus, when print data are received from the external terminal 30, the CPU 41 may start printing of the print data after notifying the external terminal 30 that preparation for printing has been completed through a wireless LAN and receiving an instruction to start printing from the external terminal 30. When print data are received from the external terminal 30, the CPU 41 may start printing of the print data after notifying the authenticated terminal 20, rather than notifying the external terminal 30, that preparation for printing of the print data received from the external terminal 30 has been completed and receiving an instruction to start printing from the authenticated terminal 20. Printing of the print data means printing of an image represented by the print data. When printing of the print data is executed, the CPU 41 ends the print process illustrated in FIG. 4.

If the content of the instruction to handle is set to prohibit printing in the determination process in step S100, on the other hand, the CPU 41 ends the print process illustrated in FIG. 4 without printing the print data received from the external terminal 30.

If it is determined that print data have been received from the authenticated terminal 20 in the determination process in step S40 in FIG. 4, the print data received from the authenticated terminal 20 may be printed without transmitting an inquiry to the authenticated terminal 20 to ask an employee to determine whether or not the print data may be printed, since the authenticated terminal 20 has an authority to perform printing. Thus, the process proceeds to step S110 without executing the processes in steps S50 to S100, and the CPU 41 executes printing of the print data received from the authenticated terminal 20.

On the other hand, if it is determined in the determination process in step S20 in FIG. 4 that the information device which is used to perform NFC tapping on the image forming apparatus 10 is not the authenticated terminal 20, that is, if it is determined that the external terminal 30 is used to perform NFC tapping, the process proceeds to step S120.

Even when the external terminal 30 is used to perform NFC tapping earlier than the authenticated terminal 20 in this manner, the CPU 41 executes a guest print process in step S120 so that the print data received from the external terminal 30 may be printed on a recording medium in coordination with the authenticated terminal 20, and ends the print process illustrated in FIG. 4.

Figure 9:
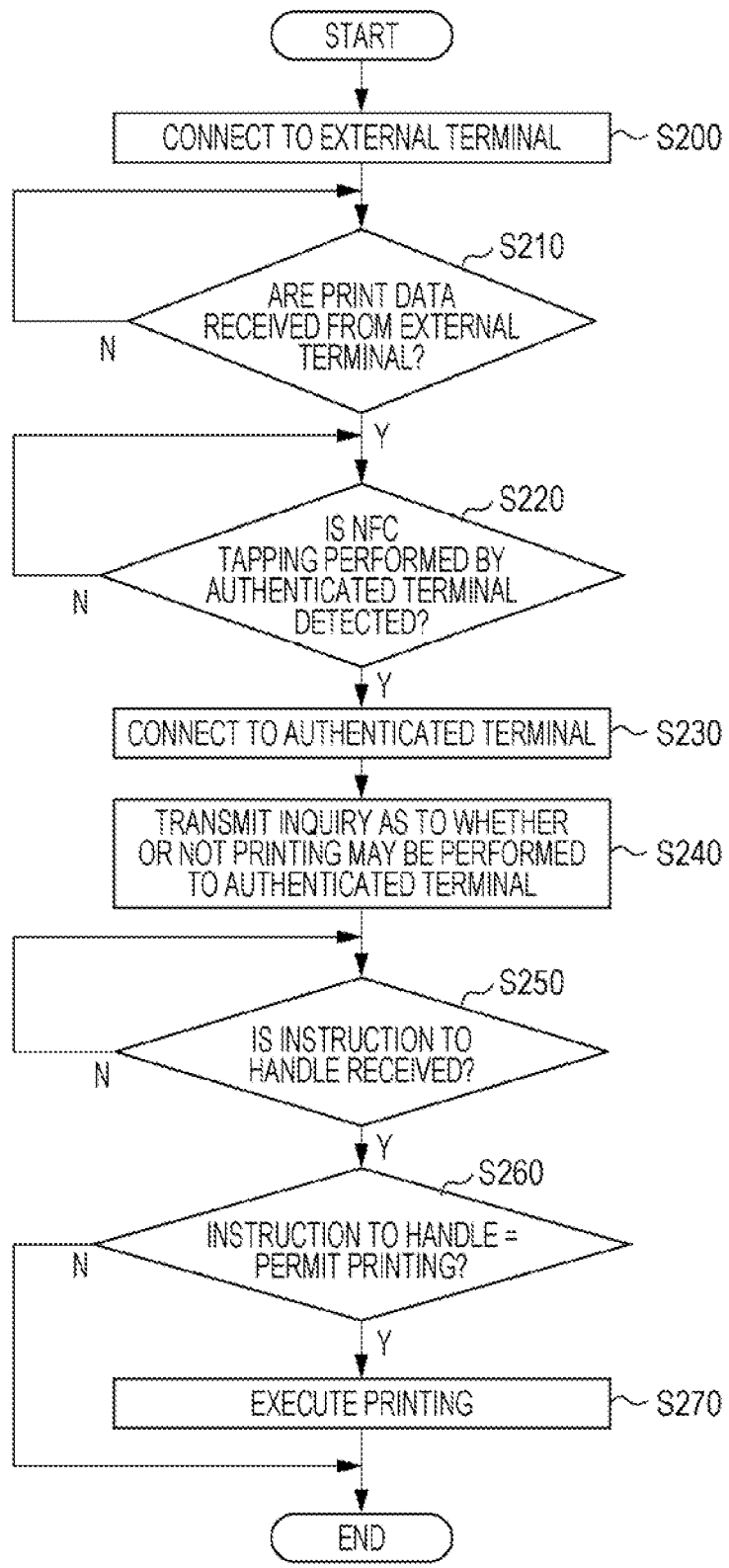
FIG. 9 is a flowchart illustrating an example of a guest print process executed by the image forming apparatus.
Figure 10:
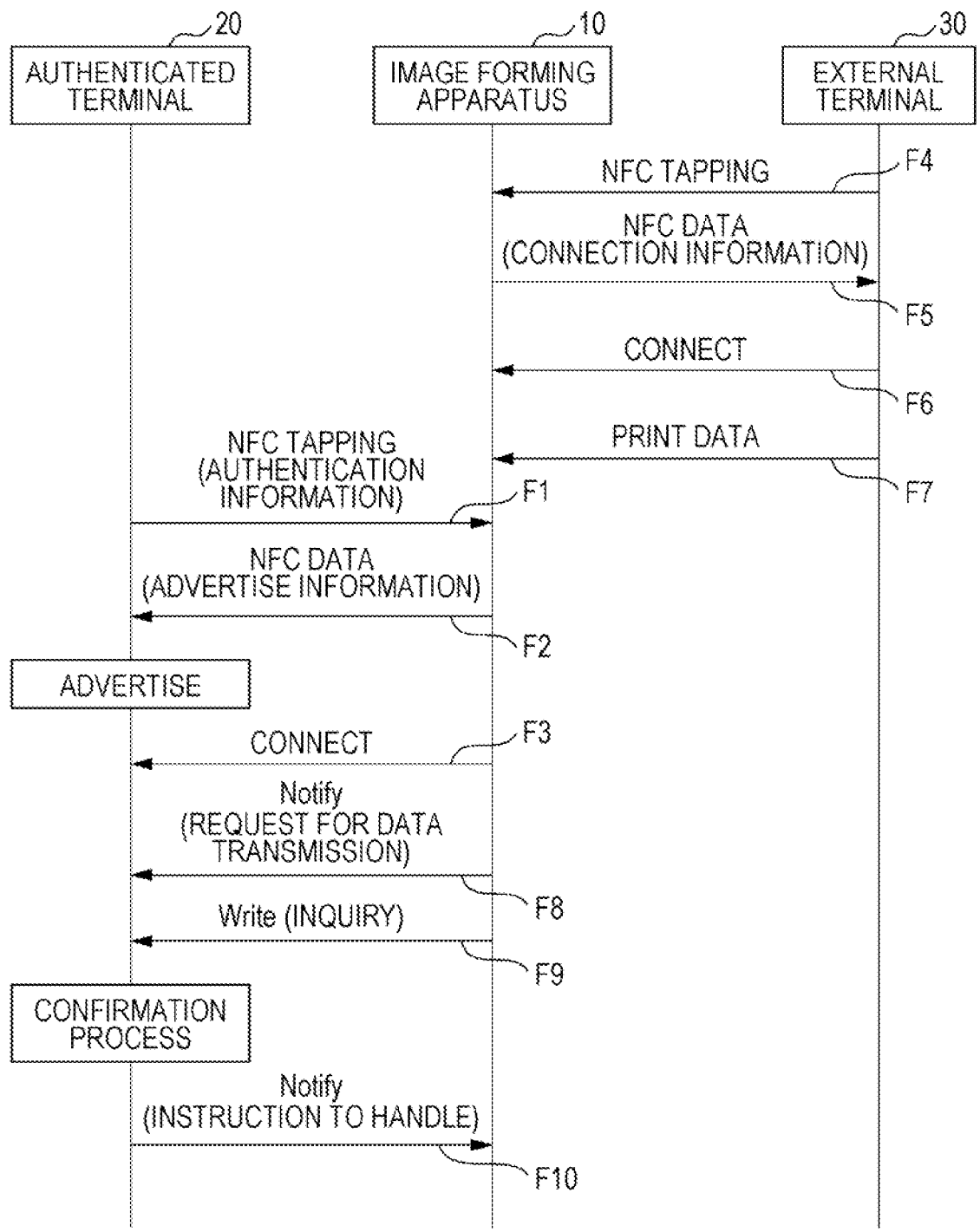
FIG. 10 is a sequence diagram illustrating an example of the flow of data transmitted and received among the image forming apparatus, the authenticated terminal, and the external terminal when the guest print process is executed.

FIG. 9 is a flowchart illustrating an example of the guest print process executed in step S120 in FIG. 4. FIG. 10 is a sequence diagram illustrating the flow of data transmitted and received among the image forming apparatus 10, the authenticated terminal 20, and the external terminal 30 when the guest print process illustrated in FIG. 9 is executed.

When the external terminal 30 is used to perform NFC tapping earlier than the authenticated terminal 20 is used to perform NFC tapping as indicated in a sequence F4 in FIG. 10, the CPU 41 connects to the external terminal 30 by way of a wireless LAN in step S200 in FIG. 9, as described in relation to step S60 in FIG. 4, to be able to perform data communication with the external terminal 30 using a wireless LAN (sequences F5 and F6 in FIG. 10).

When connection is established with the external terminal 30, which is used to perform NFC tapping, through a wireless LAN, the CPU 41 determines whether or not print data have been received from the external terminal 30 by way of a wireless LAN in step S210 in FIG. 9.

If print data have not been received, the CPU 41 repeatedly executes the determination process in step S210, and stands by until print data are received from the external terminal 30. If print data have been received from the external terminal 30 (sequence F7 in FIG. 10), on the other hand, the process proceeds to step S220.

Print permission from an employee is needed in order for the image forming apparatus 10 to print the print data received from the external terminal 30. Thus, a guest speaks to an employee to ask the employee to perform NFC tapping on the NFC unit 48 of the image forming apparatus 10 using the authenticated terminal 10.

In step S220, meanwhile, the CPU 41 determines whether or not NFC tapping performed using the authenticated terminal 20 is detected. If NFC tapping performed using the authenticated terminal 20 is not detected, the CPU 41 repeatedly executes the determination process in step S220, and monitors NFC tapping executed using the authenticated terminal 20. If NFC tapping performed using the authenticated terminal 20 is detected (sequence F1 in FIG. 10), on the other hand, the process proceeds to step S230.

In step S230, the CPU 41 connects to the authenticated terminal 20 by controlling the wireless unit 47, as described in relation to step S30 in FIG. 4, to be able to perform data communication with the authenticated terminal 20 using near-field wireless communication (sequences F2 and F3 in FIG. 10).

In step S240, the CPU 41 transmits an inquiry for the print data received from the external terminal 30 to the authenticated terminal 20 by way of near-field wireless communication (sequences F8 and F9 in FIG. 10).

As described already with reference to FIGS. 8A to 8C, the authenticated terminal 20 executes a confirmation process in response to the inquiry, and transmits an instruction to handle the inquiry to the image forming apparatus 10. Therefore, in step S250, the CPU 41 determines whether or not an instruction to handle the print data received from the external terminal 30 has been received from the authenticated terminal 20. If an instruction to handle has not been received from the authenticated terminal 20, the CPU 41 monitors reception of an instruction to handle by repeatedly executing the determination process in step S250. If an instruction to handle has been received from the authenticated terminal 20 (sequence F10 in FIG. 10), on the other hand, the process proceeds to step S260.

In step S260, the CPU 41 determines whether or not the content of the received instruction to handle is set to permit printing. If the content of the instruction to handle is set to permit printing, the process proceeds to step S270. In step S270, the CPU 41 makes preparation for printing of the received print data. When printing of the print data is executed, the guest print process illustrated in FIG. 9 is ended.

If the content of the instruction to handle is set to prohibit printing in the determination process in step S260, on the other hand, the CPU 41 ends the guest print process illustrated in FIG. 9 without printing the print data received from the external terminal 30. Ending the guest print process in FIG. 9 also corresponds to ending the print process in FIG. 4.

The description of the print process illustrated in FIG. 4 is now finished.

In the guest print process illustrated in FIG. 9, a guest speaks to an employee to ask the employee to perform NFC tapping on the NFC unit 48 of the image forming apparatus 10 using the authenticated terminal 20, in order for the image forming apparatus 10 to print the print data transmitted from the external terminal 30. If it is determined in the determination process in step S210 in FIG. 9 that the print data have been received from the external terminal 30, however, the CPU 41 may connect to the authenticated terminal 20 through near-field wireless communication by executing step S230 before executing the determination process in step S220, and transmit a request to perform NFC tapping on the NFC unit 48 of the image forming apparatus 10 using the authenticated terminal 20 to the authenticated terminal 20. In this case, the image forming apparatus 10 serves as a peripheral to execute advertising.

When an employee has moved out of the range of reach of radio waves for near-field wireless communication while carrying the authenticated terminal 20, the transmission fails with an inquiry or a request not transmitted to the authenticated terminal 20. When the transmission of an inquiry or a request has failed, the CPU 41 preferably transmits an error notification that informs a guest that the transmission of the inquiry or the request has failed to the external terminal 30 by way of a wireless LAN, so that the guest does not keep waiting for print permission for the print data.

A request for NFC tapping is broadcast. Thus, when there are a plurality of external terminals 30, for example, an employee that has received the request using the authenticated terminal 20 occasionally does not know which external terminal 30 transmitted the request for NFC tapping. Thus, the CPU 41 may transmit identification information on the external terminal 30 which transmitted the print data to the authenticated terminal 20 together with the request. The employee is able to determine on the basis of the identification information on the external terminal 30 whether or not the request for NFC tapping is from a guest related to the employee himself/herself, and therefore may perform NFC tapping on the NFC unit 48 of the image forming apparatus 10 using the authenticated terminal 20.

Similarly, an employee that has received the inquiry in step S80 in FIG. 4 and step S240 in FIG. 9 using the authenticated terminal 20 may not see what external terminal 30 the authenticated terminal 20 has received the print data from or what the content of the print data is only from the inquiry which simply inquires whether or not the print data received from the external terminal 30 may be printed, and may be at a loss whether or not to permit printing of the print data.

Thus, the CPU 41 may transmit at least one of identification information on the external terminal 30 which transmitted the print data and data information representing the content of the print data received from the external terminal 30 to the authenticated terminal 20 together with the inquiry.

Specifically, the identification information on the external terminal 30 may be information that uniquely identifies the external terminal 30 such as the terminal name of the external terminal 30 and the guest name of a guest that operates the external terminal 30, and the data information representing the content of the print data may be a thumbnail 3 of an image to be formed on a recording medium when the print data are printed, or the file name of the print data.

Figure 11:
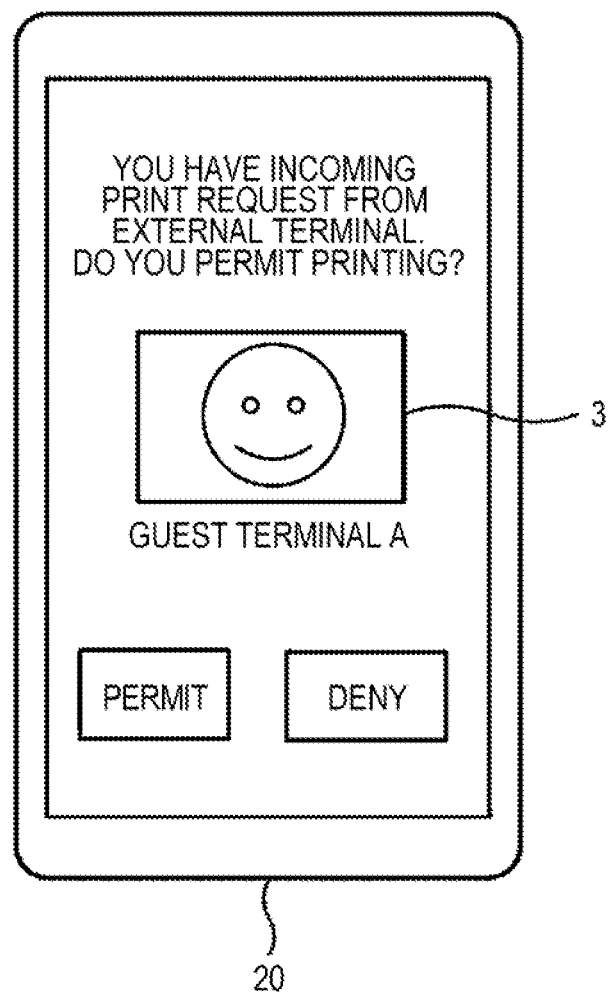
FIG. 11 illustrates an example of a confirmation screen to be displayed on the authenticated terminal.

FIG. 11 illustrates an example of a confirmation screen to be displayed on the authenticated terminal 20 which has received the terminal name of the external terminal 30 which transmitted the print data and a thumbnail 3 of an image represented by the print data received from the external terminal 30 from the image forming apparatus 10 together with an inquiry. The terminal name of the external terminal 30, namely "GUEST TERMINAL A", and the thumbnail 3 of the image represented by the print data are displayed in the example of the confirmation screen illustrated in FIG. 11. Thus, the employee is able to see what print data from whom the inquiry as to whether or not to print is about.

It is conceivable that identification information on the external terminal 30, such as the terminal name of the external terminal 30 and the guest name of a guest that operates the external terminal 30, is forged to perform printing through so-called "spoofing". Thus, the CPU 41 may perform a print process with the addition of security measures.

Specifically, an employee and a guest share the same personal identification number (PIN) code. The guest sets the PIN code on the setting screen illustrated in FIG. 7A, and transmits the PIN code to the image forming apparatus 10 together with print data. When the PIN code is set to the print data received from the external terminal 30, the CPU 41 also transmits the PIN code to the authenticated terminal 20 together with an inquiry.

When the CPU 61 of the authenticated terminal 20 which has received the PIN code together with the inquiry displays the PIN code received from the image forming apparatus 10 on the confirmation screen illustrated in FIG. 8A or 11, the employee is able to see that the received inquiry is an inquiry as to whether or not print data from the legitimate guest may be printed. The PIN code, which is used to determine whether or not print data may be printed, is an example of print setting.

<Modification of Print Process by Image Forming Apparatus 10>

In the print process illustrated in FIG. 4, an employee that has received an inquiry from the image forming apparatus 10 using the authenticated terminal 20 inputs an instruction to handle through the confirmation screen illustrated in FIG. 8A or 11. Here, a modification of the print process in which the image forming apparatus 10 is able to determine whether or not the print data received from the external terminal 30 may be printed, without an employee inputting an instruction to handle using the authenticated terminal 20, will be described.

Figure 12:
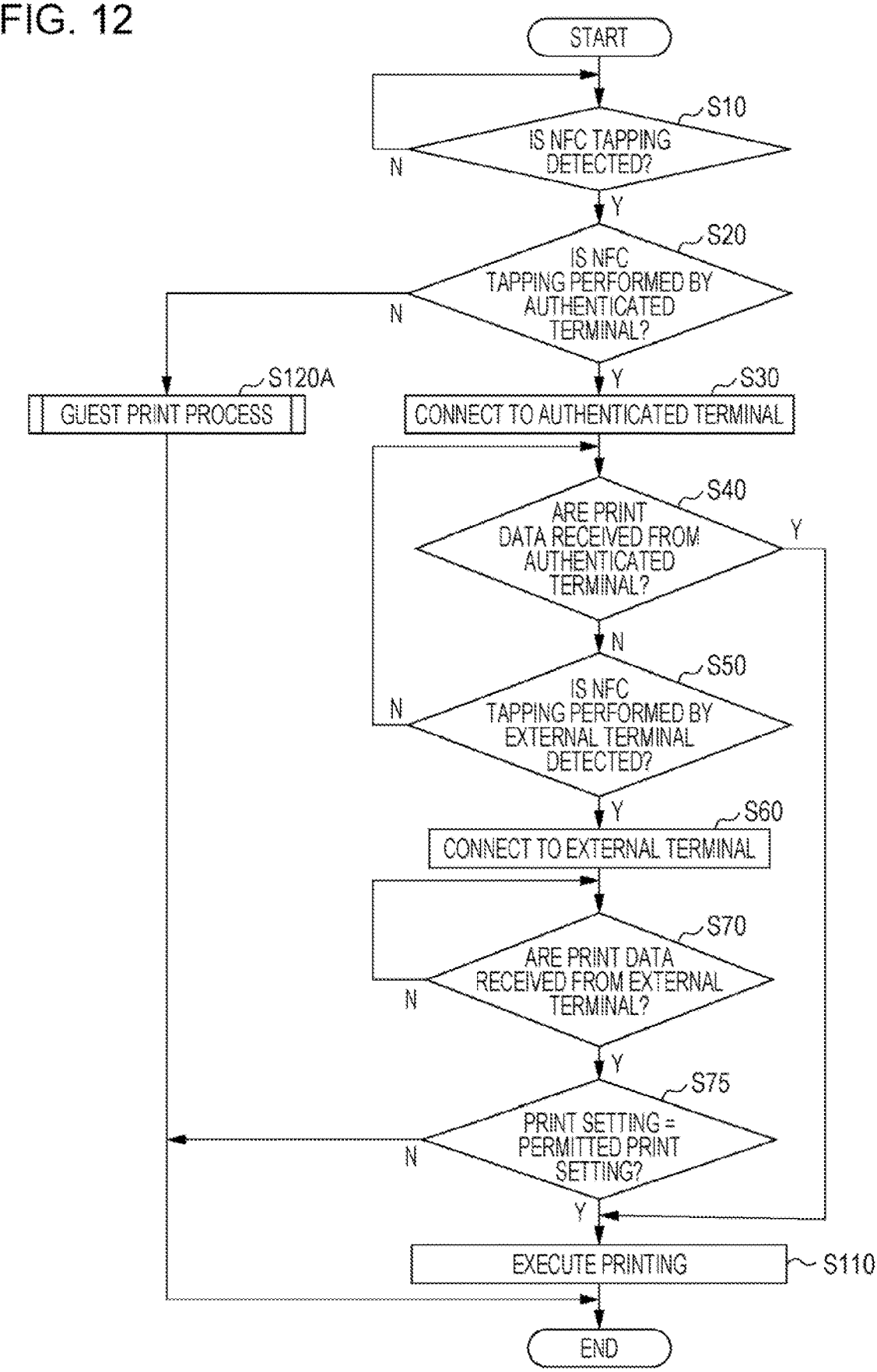
FIG. 12 is a flowchart illustrating a modification of the print process to be executed by the image forming apparatus.

FIG. 12 is a flowchart illustrating an example of a print process according to the present modification executed by the CPU 41 of the image forming apparatus 10. The flowchart of the print process illustrated in FIG. 12 is different from the flowchart of the print process illustrated in FIG. 4 in that step S75 has been added in place of steps S80 to S100 which have been deleted and that step S120 has been replaced with step S120A.

Figure 13:
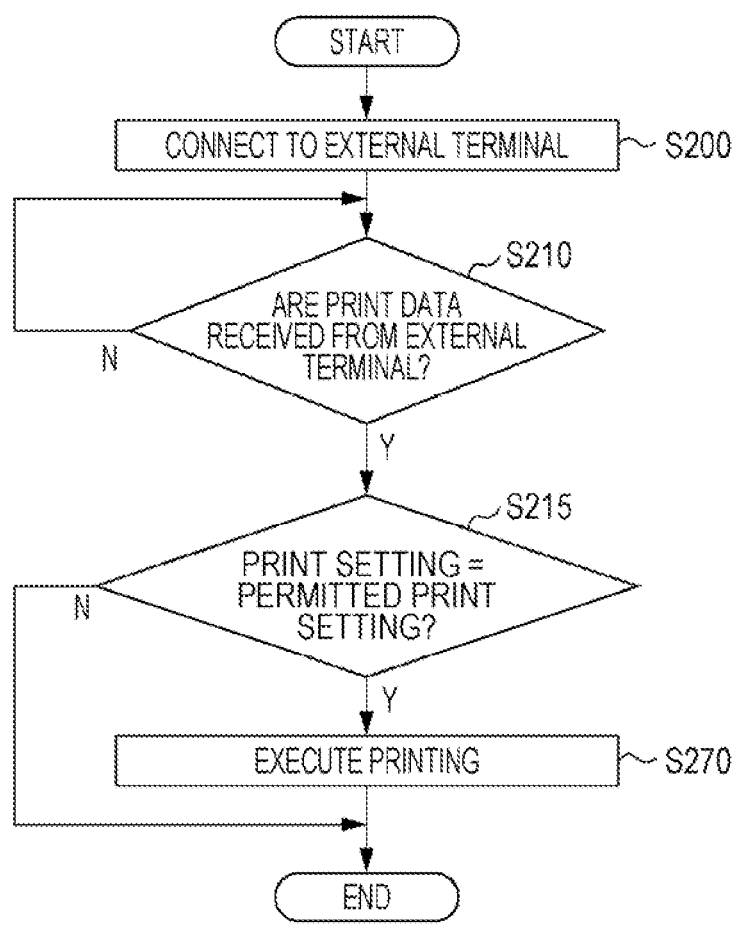
FIG. 13 is a flowchart illustrating a guest print process in the modification of the print process.

FIG. 13 is a flowchart illustrating an example of a guest print process that constitutes step S120A of the print process according to the present modification illustrated in FIG. 12. The guest print process illustrated in FIG. 13 is different from the guest print process illustrated in FIG. 9 in that step S215 has been added in place of steps S220 to S260 which have been deleted.

The processes in FIGS. 12 and 13 other than the differences mentioned above are the same as those of the print process illustrated in FIG. 4 and the guest print process illustrated in FIG. 9, respectively.

The image forming program which prescribes the modification of the print process illustrated in FIG. 12 is stored in advance in the ROM 42 of the image forming apparatus 10, for example. The CPU 41 of the image forming apparatus 10 reads the image forming program stored in the ROM 42, and executes the modification of the print process illustrated in FIG. 12.

The non-volatile memory 44 of the image forming apparatus 10 stores in advance print setting with which printing of the print data received from the external terminal 30 is permitted, that is, "permitted print setting". The permitted print setting is set by an operation of the UI unit 49 of the image forming apparatus 10 by an employee, or an operation of the UI unit 69 of the authenticated terminal 20 by an employee. When an employee sets permitted print setting using the authenticated terminal 20, the set permitted print setting is stored in the non-volatile memory 44 of the image forming apparatus 10 through near-field wireless communication. However, the permitted print setting may be stored in the non-volatile memory 44 of the image forming apparatus 10 by performing NFC tapping on the NFC unit 48 of the image forming apparatus 10 using the authenticated terminal 20.

If it is determined in the determination process in step S70 in FIG. 12 that the print data have been received from the external terminal 30 which is used to perform NFC tapping later than the authenticated terminal 20, step S75 is executed.

In step S75, the CPU 41 determines whether or not the print setting received from the external terminal 30 together with the print data is set to the same content as the permitted print setting. If the print setting for the print data is set to the same content as the permitted print setting, the print data with the print setting is determined as print data permitted in advance by an employee to be printed, without even inquiring an employee whether or not the print data may be printed. Thus, the CPU 41 transitions to step S110 without transmitting an inquiry to the authenticated terminal 20, and starts printing of the print data after making preparation to print the received print data.

If the print setting for the print data is set to a different content from the permitted print setting, on the other hand, the print data with the print setting is determined as print data prohibited in advance by an employee from being printed, without even inquiring an employee whether or not the print data may be printed. Thus, the CPU 41 ends the print process illustrated in FIG. 12, and does not print the print data received from the external terminal 30, without transmitting an inquiry to the authenticated terminal 20.

Specifically, when the color mode is selected as the permitted print setting and the content of the color mode is set to "black and white", the CPU 41 prints the print data if the color mode of the print data is set to "black and white", and the CPU 41 does not print the print data if the color mode of the print data is set to "color".

When there are a plurality of permitted print settings, an employee may set, in advance, whether collation between the print settings for the print data and the permitted print settings is made through AND collation or OR collation.

If collation between the print settings for the print data and the permitted print settings is set to be made through AND collation, the CPU 41 prints the print data if all the print settings for the print data are set to the same content as the permitted print settings.

Specifically, when the color mode and the paper size are selected as the permitted print settings and the content of the color mode is set to "black and white" and the content of the paper size is set to "A4", the CPU 41 prints the print data if the color mode of the print data is set to "black and white" and the paper size of paper for printing of an image is set to "A4".

If collation between the print settings for the print data and the permitted print settings is set to be made through OR collation, on the other hand, the CPU 41 prints the print data if at least one of the print settings for the print data is set to the same content as the permitted print setting.

Specifically, when the color mode and the paper size are selected as the permitted print settings and the content of the color mode is set to "black and white" and the content of the paper size is set to "A4", the CPU 41 prints the print data if the color mode of the print data is set to "black and white" and the paper size of paper for printing of an image is set to "A4".

Examples of the type of collation between the print settings for the print data and the permitted print settings include threshold collation, besides AND collation and OR collation. In threshold collation, the print data are printed if the number of print settings for the print data set to the same content as the permitted print settings is equal to or more than a threshold set in advance.

Specifically, if the threshold is set to "3", the CPU 41 prints the print data if the number of print settings for the print data set to the same content as the plurality of permitted print settings is three or more.

If it is determined in the determination process in step S20 in FIG. 12 that NFC tapping is performed using the external terminal 30, on the other hand, the process proceeds to step S120A, and the guest print process illustrated in FIG. 13 is executed. In the guest print process illustrated in FIG. 13, step S215 is executed when print data are received from the external terminal 30 through a wireless LAN.

In step S215, as in the determination process in step S75 in FIG. 12, the CPU 41 determines whether or not the print setting received from the external terminal 30 together with the print data is set to the same content as the permitted print setting. If the print setting for the print data is set to the same content as the permitted print setting, the print data with the print setting is determined as print data permitted in advance by an employee to be printed, without even inquiring an employee whether or not the print data may be printed. Thus, the CPU 41 transitions to step S270 without transmitting an inquiry to the authenticated terminal 20, and starts printing of the print data after making preparation to print the received print data.

If the print setting for the print data is set to a different content from the permitted print setting, on the other hand, the print data with the print setting is determined as print data prohibited in advance by an employee from being printed, without even inquiring an employee whether or not the print data may be printed. Thus, the CPU 41 ends the guest print process illustrated in FIG. 13, and does not print the print data received from the external terminal 30, without transmitting an inquiry to the authenticated terminal 20.

The type of collation between the print settings for the print data and the permitted print settings in a situation in which there are a plurality of permitted print settings, described in relation to step S75 in FIG. 12, is also applied to the determination process in step S215 in FIG. 13.

<Modification of Confirmation Process by Authenticated Terminal 20>

In the modification of the print process by the image forming apparatus 10 described above, the permitted print setting is stored in advance in the non-volatile memory 44 of the image forming apparatus 10, which makes it possible to determine whether or not the print data received from the external terminal 30 may be printed, without an employee inputting an instruction to handle using the authenticated terminal 20.

In an example to be described here, the permitted print setting is stored in advance in the non-volatile memory 64 of the authenticated terminal 20 in place of the non-volatile memory 44 of the image forming apparatus 10, which makes it possible to determine whether or not the print data received from the external terminal 30 may be printed, without an employee inputting an instruction to handle using the authenticated terminal 20.

The permitted print setting is stored in the non-volatile memory 64 of the authenticated terminal 20 by an employee operating the UI unit 69 of the authenticated terminal 20.

Figure 14:
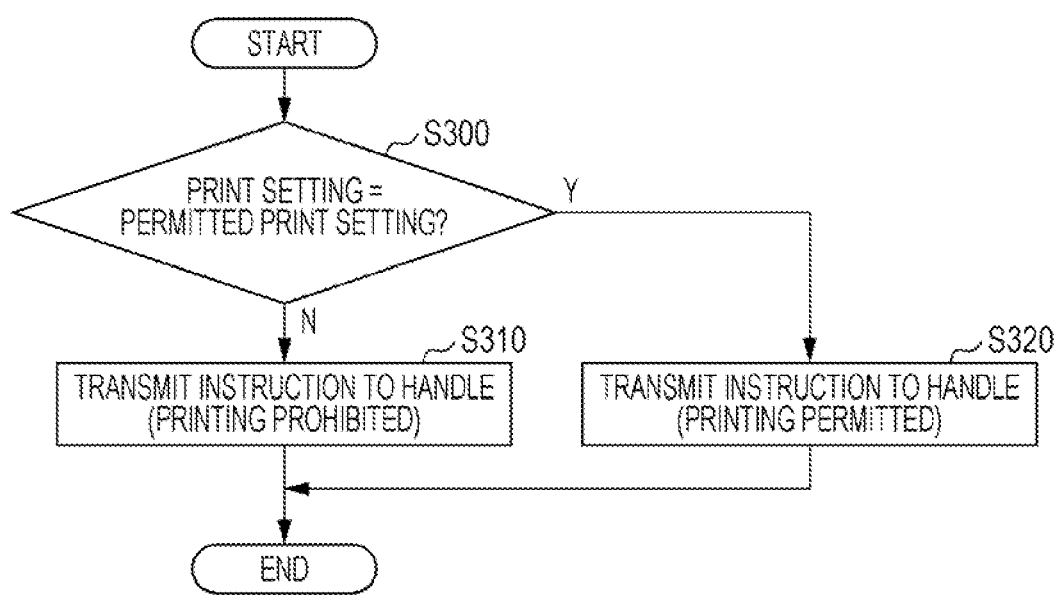
FIG. 14 is a flowchart illustrating a modification of the confirmation process to be executed by the authenticated terminal.

While the print process illustrated in FIG. 4 is executed in the image forming apparatus 10, the confirmation process illustrated in FIG. 14 is executed in the authenticated terminal 20. The inquiry that the image forming apparatus 10 transmits to the authenticated terminal 20 in step S80 in FIG. 4 and step S240 in FIG. 9 is assumed to include print setting for the print data received from the external terminal 30.

FIG. 14 is a flowchart illustrating an example of a confirmation process according to the present modification to be executed by the CPU 61 of the authenticated terminal 20 when an inquiry is received from the image forming apparatus 10.

An authentication program that prescribes the confirmation process is stored in advance in the ROM 62 of the authenticated terminal 20, for example. The CPU 61 of the authenticated terminal 20 reads the authentication program stored in the ROM 62, and executes the confirmation process.

In step S300 in FIG. 14, the CPU 61 determines whether or not the print setting received from the image forming apparatus 10 together with the inquiry is set to the same content as the permitted print setting stored in the non-volatile memory 64.

If the print setting for the print data is set to a different content from the permitted print setting, the print data received from the external terminal 30 is determined as print data prohibited in advance by an employee from being printed. Thus, the process proceeds to step S310. In step S310, the CPU 61 transmits an instruction to handle with the content set to printing prohibited to the image forming apparatus 10 by way of near-field wireless communication, by controlling the wireless unit 67. Then, the confirmation process illustrated in FIG. 14 is ended.

If the print setting for the print data is set to the same content as the permitted print setting, on the other hand, the print data received from the external terminal 30 is determined as print data permitted in advance by an employee to be printed. Thus, the process proceeds to step S320. In step S320, the CPU 61 transmits an instruction to handle with the content set to printing permitted to the image forming apparatus 10 by way of near-field wireless communication, by controlling the wireless unit 67. Then, the confirmation process illustrated in FIG. 14 is ended.

The type of collation between the print settings for the print data and the permitted print settings in a situation in which there are a plurality of permitted print settings, described in relation to step S75 in FIG. 12, is also applied to the determination process in step S300 in FIG. 14.

While an aspect of the image forming system 1 has been described above using an exemplary embodiment, the disclosed aspect of the image forming system 1 is exemplary, and the aspect of the image forming system 1 is not limited to the range of description of the exemplary embodiment. A variety of modifications and alterations may be made to the exemplary embodiment without departing from the scope and spirit of the present disclosure. Such modified or altered forms also fall within the technical scope of the present disclosure. For example, the order of the print process illustrated in FIGS. 4 and 9, the modification of the print process illustrated in FIGS. 12 and 13, and the confirmation process illustrated in FIG. 14 may be changed without departing from the scope and spirit of the present disclosure.

In the exemplary embodiment described above, the processes are implemented using software, by way of example. However, processes that are similar to those of the flowcharts illustrated in FIGS. 4, 9, and 12 to 14 may be implemented using hardware.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In the exemplary embodiment described above, the image forming program is stored in the ROM 42. However, the location of storage of the image forming program is not limited to the ROM 42. The image forming program according to the present disclosure may be provided as stored in a storage medium that is readable by the computer 40. For example, the image forming program may be provided as stored in an optical disk such as a compact disk read only memory (CD-ROM) and a digital versatile disk read only memory (DVD-ROM). Alternatively, the image forming program may be provided as stored in a portable semiconductor memory such as a Universal Serial Bus (USB) memory and a memory card.

Similarly, the authentication program according to the present disclosure is not limited to being stored in the ROM 62, and may be provided as stored in a storage medium that is readable by the computer 60.

The ROM 42, the ROM 62, the non-volatile memory 44, the non-volatile memory 64, the CD-ROM, the DVD-ROM, the USB memory, and the memory card are examples of a non-transitory storage medium.

Further, the image forming apparatus 10 may download the image forming program from an external device (not illustrated) connected to a wireless LAN, and store the downloaded image forming program in the non-transitory storage medium. In this case, the CPU 41 of the image forming apparatus 10 reads the image forming program downloaded from the external device (not illustrated), and executes the print process.

Similarly, the authenticated terminal 20 may download the authentication program from an external device (not illustrated) connected to a wireless LAN, and store the downloaded authentication program in the non-transitory storage medium. In this case, the CPU 61 of the authenticated terminal 20 reads the authentication information downloaded from the external device (not illustrated), and executes the print process.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
a processor configured to:
    transmit an inquiry whether printing of print data is allowed to an authenticated terminal when the print data are received from an external terminal, the authenticated terminal having an authority to perform printing and the external terminal being not registered in advance as the authenticated terminal;
    make preparation to print the print data when a permission to print the print data is received from the authenticated terminal;
    receive a print setting, for which printing of the print data is permitted, from the authenticated terminal before receiving the print data from the external terminal; and
    make preparation to print the print data, without transmitting the inquiry to the authenticated terminal, when the print setting is set for the print data.

2. The image forming apparatus according to claim 1,
wherein the processor is configured to transmit at least one of identification information that identifies the external terminal and data information that represents a content of the print data to the authenticated terminal together with the inquiry.

3. The image forming apparatus according to claim 2,
wherein the identification information includes a terminal name set in advance to the external terminal, and the data information includes a thumbnail of an image to be formed on a recording medium when the print data are printed on the recording medium.

4. The image forming apparatus according to claim 3,
wherein the processor is configured to:
    receive a plurality of print settings for which printing of the print data from the external terminal is permitted; and
    make preparation to print the print data, without transmitting the inquiry to the authenticated terminal, when all of the plurality of print settings are set for the print data or when one of the plurality of print settings is set for the print data.

5. The image forming apparatus according to claim 1,
wherein the processor is configured to:

receive a plurality of print settings for which printing of the print data from the external terminal is permitted; and make preparation to print the print data, without transmitting the inquiry to the authenticated terminal, when all of the plurality of print settings are set for the print data or when one of the plurality of print settings is set for the print data.

6. The image forming apparatus according to claim 1, wherein the processor is configured to transmit, to the external terminal, an error notification that indicates a failure of transmission of the inquiry to the authenticated terminal when such transmission of the inquiry fails.

7. The image forming apparatus according to claim 2, wherein the processor is configured to:

receive a plurality of print settings for which printing of the print data from the external terminal is permitted; and make preparation to print the print data, without transmitting the inquiry to the authenticated terminal, when all of the plurality of print settings are set for the print data or when one of the plurality of print settings is set for the print data.

8. The image forming apparatus according to claim 2, wherein the processor is configured to transmit, to the external terminal, an error notification that indicates a failure of transmission of the inquiry to the authenticated terminal when transmission of the inquiry fails.

9. The image forming apparatus according to claim 3, wherein the processor is configured to transmit, to the external terminal, an error notification that indicates a failure of transmission of the inquiry to the authenticated terminal when transmission of the inquiry fails.

10. A non-transitory computer readable medium storing a program causing a computer to execute a process for forming an image, the process comprising:

transmitting an inquiry whether printing of print data is allowed to an authenticated terminal when the print data are received from an external terminal, the authenticated terminal having an authority to perform printing and the external terminal being not registered in advance as the authenticated terminal;

starting to print the print data when a permission to print the print data is received from the authenticated terminal;

receiving a print setting, for which printing of the print data is permitted, from the authenticated terminal before receiving the print data from the external terminal; and starting to print the print data, without transmitting the inquiry to the authenticated terminal, when the print setting is set for the print data.

11. An image forming system comprising:

an image forming apparatus; and an authenticated terminal that is permitted to perform printing using the image forming apparatus; wherein the image forming apparatus is configured to transmit an inquiry whether printing of print data is allowed to the authenticated terminal when the print data are received from an external terminal that is not registered in advance as the authenticated terminal, and is configured to make preparation to print the print data when a permission to print the print data is received from the authenticated terminal, the authenticated terminal is configured to receive a print setting, for which printing of the print data is permitted, from a user of the authenticated terminal, and a permission to print the print data is transmitted from the authenticated terminal to the image forming apparatus, without receiving an instruction whether to permit printing of the print data from the user of the authenticated terminal, when the print setting is set for the print data which have been received from the image forming apparatus together with the inquiry.

* * * * *